United States Patent [19]

Shibata

[11] Patent Number: 5,348,516

[45] Date of Patent: Sep. 20, 1994

[54] TRANSAXLE FOR MIDSHIP TRANSVERSELY MOUNTED ENGINE

[75] Inventor: Masanori Shibata, Shizuoka, Japan

[73] Assignee: JATCO Corporation, Fuji, Japan

[21] Appl. No.: 937,603

[22] Filed: Sep. 2, 1992

[30] Foreign Application Priority Data

Sep. 2, 1991 [JP] Japan .................. 3-248261

[51] Int. Cl.⁵ .............. F16H 1/00; B60K 17/16; B60K 17/28
[52] U.S. Cl. ..................... 475/206; 180/248; 180/297
[58] Field of Search .......... 180/245, 248, 291, 292, 180/374, 297; 475/198, 206

[56] References Cited

U.S. PATENT DOCUMENTS

| 4,650,202 | 3/1987 | Tsuzuki | 475/206 X |
| 5,078,229 | 1/1992 | Kikuchi et al. | 180/248 |
| 5,143,167 | 9/1992 | Moriyama et al. | 180/248 |
| 5,184,695 | 2/1993 | Matsuda et al. | 180/248 X |

FOREIGN PATENT DOCUMENTS

| 0192324 | 8/1986 | European Pat. Off. | |
| 2207590 | 8/1973 | Fed. Rep. of Germany. | |
| 240869 | 11/1986 | Fed. Rep. of Germany. | |
| 60-82448 | 5/1985 | Japan. | |
| 262429 | 10/1990 | Japan | 180/248 |
| 262430 | 10/1990 | Japan | 180/248 |
| 290721 | 11/1990 | Japan | 475/206 |
| 231031 | 10/1991 | Japan | 180/297 |

Primary Examiner—Leslie A. Braun
Assistant Examiner—Khoi Ta
Attorney, Agent, or Firm—Foley & Lardner

[57] ABSTRACT

A transaxle for a drive system of a vehicle including a midship transversely mounted engine. The transaxle comprising a transmission, a differential mechanism for differential action between a set of rear wheels of the vehicle, and a transfer case for transferring drive torque to a set of front wheels of the vehicle. The transmission has a main shaft extending transversely with respect to a logitudinal direction of the vehicle. Disposed rearwardly of the main shaft is the differential mechanism, while disposed forwardly of the main shaft is the transfer case. Drive torque from the main shaft is transferred via two power flows to a differential case of the rear differential mechanism and to an input shaft of the transfer case.

8 Claims, 5 Drawing Sheets

TRANSAXLE FOR MIDSHIP TRANSVERSELY MOUNTED ENGINE

BACKGROUND OF THE INVENTION

The present invention relates to a drive system for a vehicle, and more particularly to a transaxle for a drive system which allows a midship and transverse mount of an engine in a vehicle.

In a conventional four-wheel drive system in a vehicle having a transversely mounted from drive engine, a transaxle has a front differential mechanism disposed rearwardly of, with respect to a longitudinal direction of the vehicle, a main shaft of a transmission and a transfer case is disposed rearwardly of the front differential mechanism and connected to a differential case of the front different mechanism for receiving drive torque and transferring same toward a rear differential mechanism connected to rear wheels.

There is a growing demand for four-wheel drive system suitable for a midship arrangement of a transversely mounted engine. Specifically, a transaxle suitable for use in the four-wheel drive system for midship transversely mounted engine is strongly needed.

This demand is not met by simplying applying the conventional teachings to the midship transversely mounted engine. Let it be assumed that the teachings are applied to provide a four-wheel drive system. In order to supply power from the transfer case to the front differential mechanism, a direction of the flow of output power of the transfer case has to be changed through approximately 180 degrees and then supplied to the front differential mechanism via a propeller shaft passing under one of the rear drive axles. This arrangement wherein the propeller shaft extends under the rear drive axle is not acceptable since it is difficult to keep the minimum road clearance.

An object of the present invention is to provide a transaxle for a drive system of a vehicle having a midship arrangement of a transversely mounted engine which provides four-wheel drive system without any interference with the minimum road clearance.

SUMMARY OF THE INVENTION

According to the present invention, there is provided a transaxle for a drive system of a vehicle, the vehicle having a set of front wheels and a set of rear wheels adapted to be driven from a midship engine transversely mounted with respect to a lognitudinal direction of the vehicle, the transaxle comprising:

transmission means, connected to the engine and having a main shaft, for transferring drive torque to said main shaft, said main shaft extending transversely with respect to the longitudinal direction of the vehicle;

a differential mechanism connected to said main shaft to receive drive torque for differential action between each of the rear wheels, said differential mechanism being disposed rearwardly of said main shaft with respect to the longitudinal direction of the vehicle; and a transfer case disposed forwardly of said main shaft with respect to the longitudinal direction of the vehicle.

DETAILED DESCRIPTION OF THE INVENTION

Figure 1:
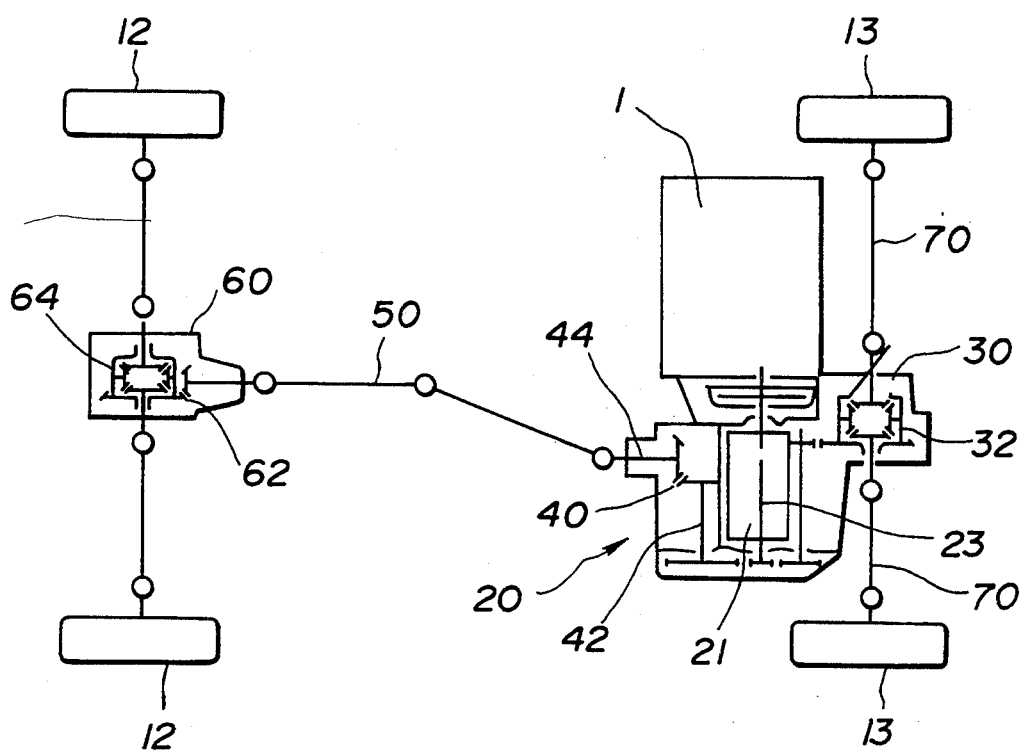
FIG. 1 is a schematic view of a drive system.

Referring to FIG. 1, a vehicle of a type suited for use with the present invention is shown. The vehicle has a set of front wheels 12 and a set of rear wheels 13 drivable from an engine 1 through a transaxle 20 having a transmission 21 which may be of the manual or automatic type although the transmission of the automatic type is described in the following description.

The engine 1 is of the transversely and midship mounted type and thus has a crankshaft rotatable about a transverse axis with respect to a longitudinal direction or line of the vehicle. The transmission 21 is connected to the engine 1 and has a main shaft 23. The main shaft 23 is disposed forwardly, with respect to the longitudinal direction of the vehicle, of rear drive axles 70 and extends transversely with respect to the logitudinal direction of the vehicle. The main shaft 23 is connected to a differential case 32 of a rear differential mechanism 30 to supply power thereto. The rear differential mechanism 30 is connected to the rear drive axles 70 for differential action between each of the rear wheels 13 connected to the ends of the rear drive axles 70, respectively. The rear differential mechanism 30 is disposed rearwardly, with respect to the longitudinal direction of the vehicle, of the main shaft 23.

In the case where the transaxle 20 is conditioned for use in four-wheel drive system, an input shaft 42 of a transfer case 40 is connected to the main shaft 23. The transfer case 40 is attached to the forward side of the transmission 21 with its input shaft 42 disposed forwardly, with respect to the longitudinal direction of the vehicle, of the main shaft 23. The input shaft 42 extends in parallel to the main shaft 23 and connected to a transfer output shaft 44 extending in the longitudinal direction of the vehicle for transferring drive torque toward a set of front wheels 12. Specifically, upon application of drive torque from the output shaft 44 to a propeller shaft 50, the propeller shaft 50 transfers torque via bevel gears 60 and 62 to a differential case of a front differential mechanism 60. The front differential mechanism 60 is connected to the front wheels 12 via drive axles, respectively.

The transaxle 20 which is conditioned for use in four-wheel drive system is further described with reference to FIG. 2, 3 and 4. Referring to FIG. 4, the main shaft 23 is arranged in line with a turbine shaft 24 which is arranged in line with the axis of rotation of the crankshaft of the engine 1. Drive torque from the engine 1 is multiplied by a torque converter 22 and then transferred from the turbine shaft 24 via the transmission 21 to the main shaft 23. The main shaft 23 projects from end face of a transmission casing 28 accommodating the transmission 21. Leading end portion of the main shaft 23 which projects out of the end face is splined to fixedly carry an output gear 25 for rear wheel drive.

As readily seen from FIG. 3, an idler shaft 34 is disposed rearwardly, with respect to the longitudinal direction of the vehicle, of and below the main shaft 23 in parallel relationship therewith. As shown in FIG. 4, the idler shaft 34 has one end portion fixedly carrying an input gear 35 in mesh with the rear wheel drive output gear 25 of the main shaft 23. The main shaft 23 and idler shaft 34 has their righthand ends, viewing in FIG. 4, rotatably supported by bearings 81 and 82, respectively, which are supported by a transmission casing cover 29. The rear wheel drive output gear 25 of the main shaft 23 and the input shaft 35 of the idler shaft 34 are disposed within a space or chamber 94 defined between the end face of the transmission casing 28 and the transmission casing cover 29. Lefthand end, viewing in FIG. 4, of the idler shaft 34 is rotatably supported by a bearing 83 supported by a torque converter housing 27.

Referring back to FIG. 3, a differential housing 38 is disposed rearwardly, with respect to the longitudinal direction of the vehicle, of the idler shaft 34. As shown in FIG. 4, the differential housing 38 is defined by portions extending from the transmission casing 28 and the torque converter housing 27. Disposed within the differential housing 38 is the rear differential mechanism 30 (see FIG. 1 also). The rear differential mechanism 30 includes a differential case 32 rotatably supported within the differential housing 38 for rotation about an axis which is in parallel to the axis of rotation of the idler shaft 34. An externally toothed ring gear 37 fixedly secured to the differential case 32 is in mesh with an output gear 36 fixedly carried by the idler shaft 34 to receive torque from the idler shaft 34. With bearings 84 and 85 respectively supported by the differential housing 38 and cover 39, the differential case 32 is rotatably supported. The rear differential mechanism 30 is connected between the drive axles 70 including universal joints 70, respectively, for differential action between the rear wheels 13 (see FIG. 1 also).

As best seen in FIG. 4, the rear wheel drive output gear 25 has a hub fixedly carrying an output gear 26 for front wheel drive. Thus, the front wheel drive output gear 26 is rotatable in unison with the rear wheel drive output gear 25. Disposed forwardly, with respect to the longitudinal direction of the vehicle, of the transmission casing 28 is a transfer housing 48 defined by an exctended portion of the transmission casing 28. The transmission casing 28 and the transfer housing 48 cooperate with each other to define an opening which is closed by the transmission casing cover 29. As readily seen from FIG. 4, the transfer housing 48 cooperates with a portion of the transmission casing 28 to define a first bore 200 having a righthand or first end 96, viewing in FIG. 4, opposed to the transmission casing cover 29 and an opposite end closed. The righthand end 96 of the bore 200 is open to the chamber 94. The transfer housing 48 has an extended portion 46 formed with a second bore 202 having a bottom or second end 98, viewing in FIG. 4, opening and an opposite end communicating with the first bore 200. As best seen in FIG. 3, the extended portion 46 extends forwardly, with respect to the longitudinal direction, of the vehicle.

A bearing holder 86, which has been inserted, in assembly, into the first bore 200 from the first end 96, holds taper bearings 87. With the bearings 87 and a bearing 88 supported by the transmission casing cover 29, a transfer input shaft 42 is rotatably supported within the first bore 200. The transfer input shaft 42 is in parallel to the main shaft 23 and disposed forwardly, with respect to the longitudinal direction of the vehicle, of the main shaft 23. The transfer input shaft 42 extends through the end 96 of the first bore 200 into the chamber 94 and has a righthand end, viewing in FIG. 4, splined to fixedly carry a transfer input gear 41 in mesh with the front wheel drive output gear 26 within the chamber 94.

Lefthand end, viewing in FIG. 4, of the transfer input shaft 42 is fixed to a bevel gear 43 which is in mesh with a bevel gear 45 fixed to a transfer output shaft 44. The transfer output shaft 44 is rotatably supported within the second bore 202 by taper bearings 90 supported by a bearing holder 89 which has been inserted, in assembly, into the second bore 202 from the second end 98. The transfer output shaft 44 extends forwardly with respect to the longitudinal direction of the vehicle, and has a front end portion 75 splined to fixedly carry a driver splined wheel 77. Disposed adjacent the driver splined wheel 77 is a driven splined wheel 78. The driven wheel 78 is rotatably supported on the end portion 75 of the transfer output shaft 44 and fixed to a shaft 76 coaxial with the transfer output shaft 44. This shaft 76 is rotatably supported within an extension 47 by means of bearing 91 supported by the extension 47. A slider 79 of a clutch 73 cooperates with the driver and driven wheels 77 and 78. The slider 79 has a first position, as illustrated in FIG. 4, wherein the slider 79 is engaged with both the driver and driven wheels 77 and 78, and a second position wherein the slider 79 is disengaged from the driver wheel 77 although it remains engaged with the driven wheel 78. Alternately, the slider 79 may take, as the second position, a position wherein the slider 79 is disengaged from the driven wheel 78 although it remains engaged with the driver wheel 77. The slider 79 is of the ring shaped formed with outer circumferential groove for receiving a shift fork 74. It will now be readily seen from the above description in connection with FIG. 4, that the clutch 73 is shiftable between the first and second positions to respectively transfer or not transfer derive torque of the transfer output shaft 44 toward the set of front wheels 12 (see FIG. 1 also). Attached to the shaft 76 is a flange 52 adapted to couple with the propeller shaft 50 (see FIG. 1 also).

In FIG. 4, a parking gear 80 is fixedly carried by the hub of the front wheel drive output gear 25. The transmission 21 illustrated in FIG. 4 is of the well known automatic type including a planetary gear train and clutch and brakes. Substantially the same structure is found in FIG. 1 of Japanese Patent Application First (unexamined) Publication No. 60-82448.

From the preceding description, it will now be understood that the main shaft 23 is connected via the rear wheel drive output gear 25 and the idler shaft 34 to the rear differential mechanism 30 to supply drive torque thereto, while it is connected via the forward wheel drive output gear 26 to the transfer case 40 to supply drive torque thereto. This split of torque into two flows to the differential mechanism 30 disposed rearwardly and to the transfer case 40 disposed forwardly, respectively, allows realization of four-wheel drive system using a midship transversely mounted engine 1.

Figure 2:
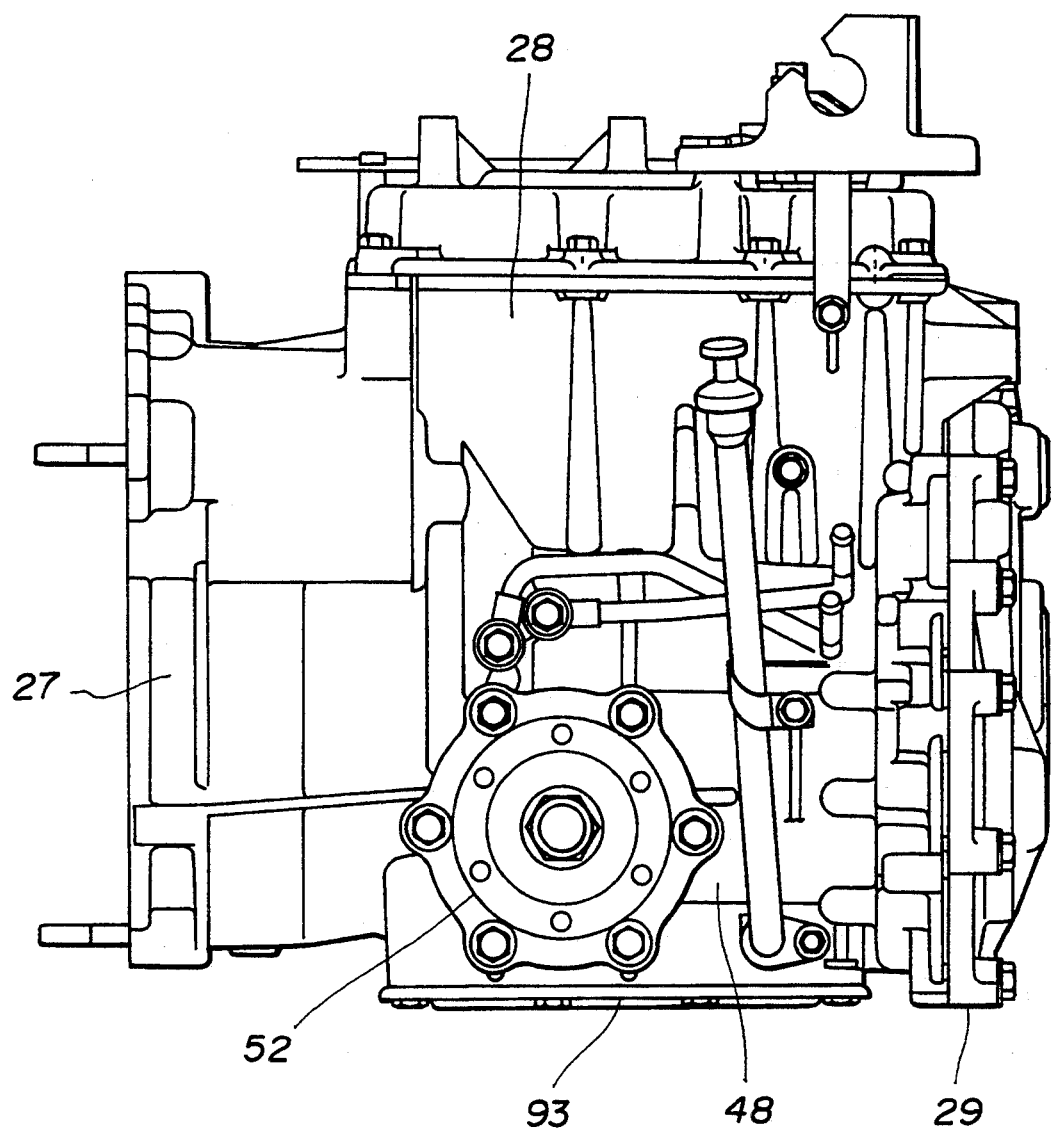
FIG. 2 is a front elevation of a transaxle for use in a four-wheel drive system.
Figure 3:
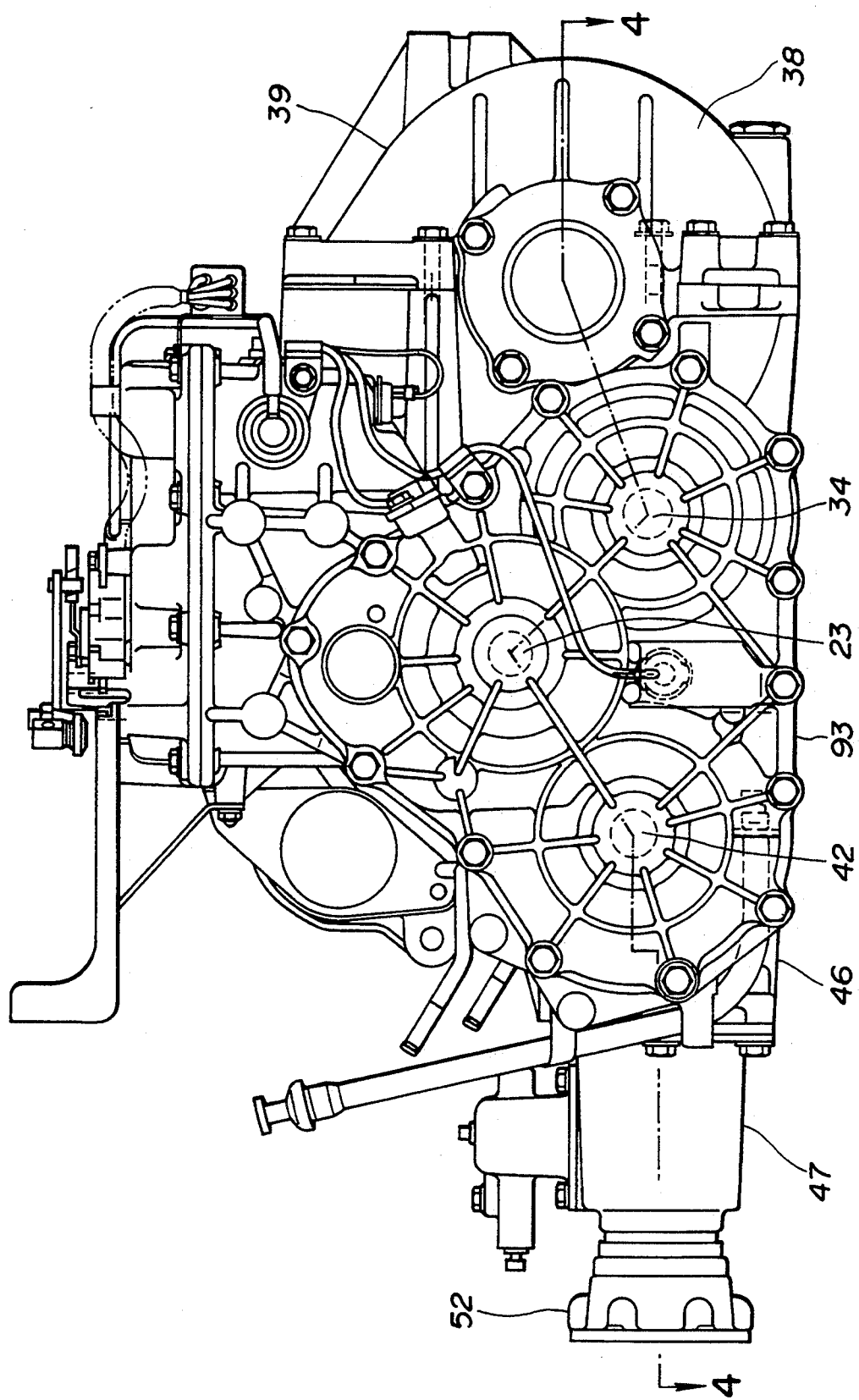
FIG. 3 is a side elevation of the transaxle.
Figure 4:
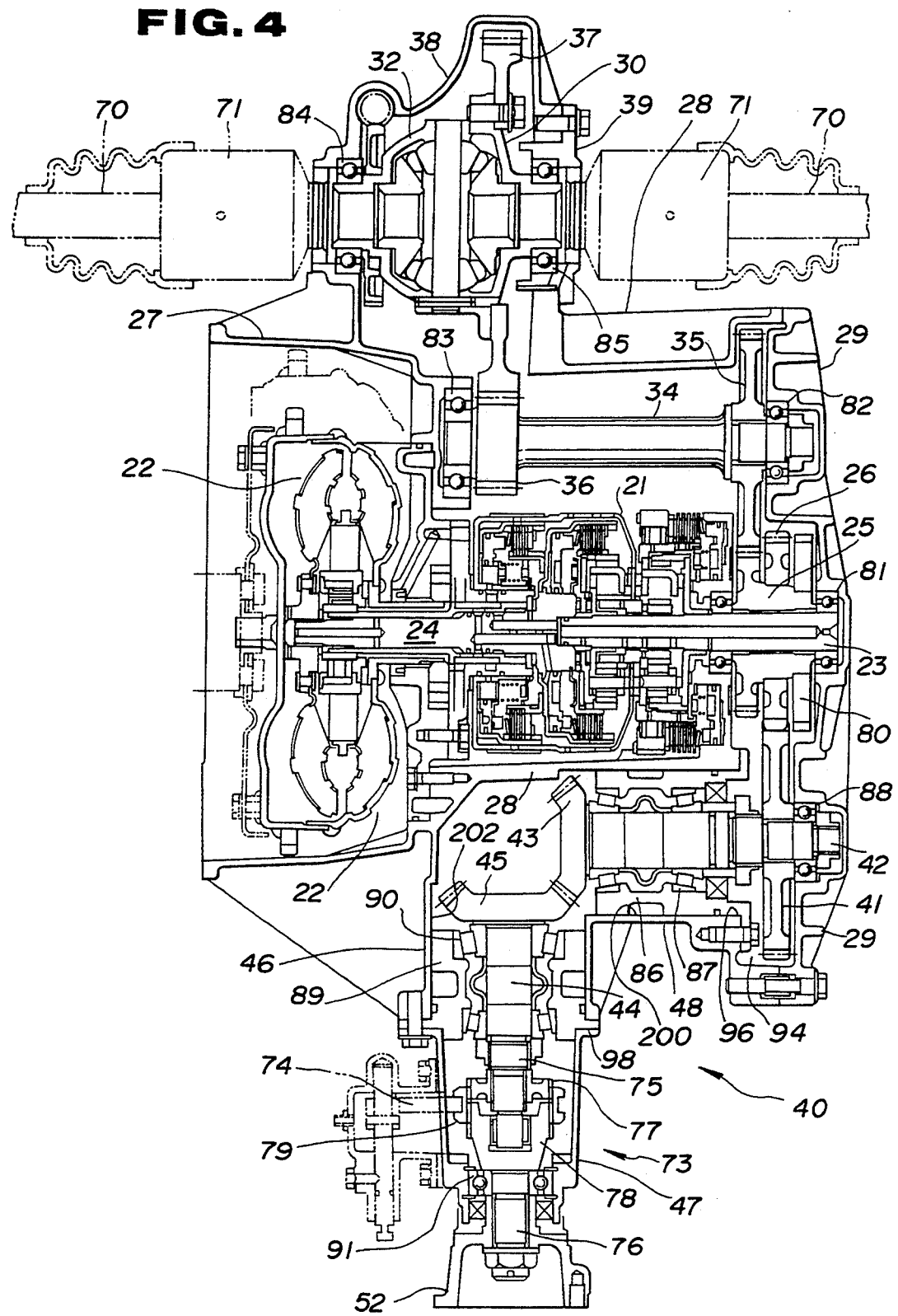
FIG. 4 is a section taken through the line 4—4 in FIG. 3.

Referring to FIGS. 2 and 3, the bottom wall of an oil pan formed in the transmission casing 28 is indicated by the reference numeral 93. As best seen in FIG. 3, the idler shaft 34 and the transfer input shaft 42 are disposed at the lowest position which is limited by the position of the bottom wall 93 of the oil pan. This arrangement has contributed much to reducing longitudinal dimension of the transaxle 20.

In assembly, the insertion of the transfer input shaft 42 is effected through the end 96 of the first bore 200 in the same manner as the insertion of the idler shaft 34 and they are rotatably supported by the bearings 88 and 82 supported by the transmission casing cover 92. Thus, the assembly is easy.

In the above-mentioned embodiment, the rear wheel drive output gear 25 and the front wheel drive output gear 26 are used to supply power to the differential mechanism 30 and the transfer case 40, respectively. Alternatively, a single gear is sufficient if a gear for delivery of power toward the differential mechanism 30 and another gear for delivery of power toward the transfer case 40 are engaged in mesh with this single gear fixed to the main shaft 23.

Figure 5:
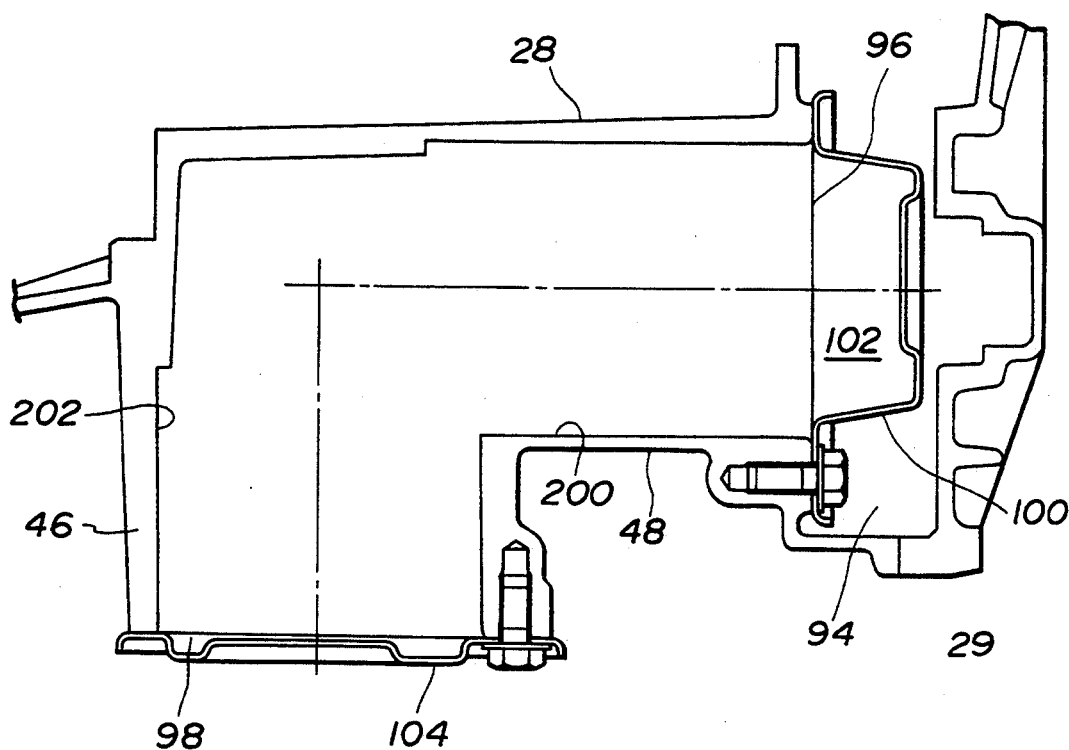
FIG. 5 is a fragmentary view of a transaxle of the same type as above but for use in a two-wheel drive system.
Figure 6:
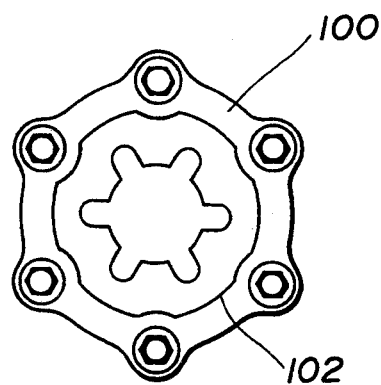
FIG. 6 is a plan view of a cover used in FIG. 5.

Referring to FIGS. 5 and 6, the transaxle 20 is further described. FIG. 5 shows a portion including the transfer housing 48 when the transaxle 20 is conditioned for use in two-wheel drive. Since the components of the transfer case 40 including the transfer input and output shafts 42 and 44 are not needed in two-wheel drive system, the bores 200 and 202 of the transfer housing 48 are empty. Further, the transfer input shaft 42 does not occupy a portion of the volume of the chamber 94 and the input gear 42 on the transfer input shaft 42 and the front wheel drive output gear 26 on the main shaft 23 do not occuply portions of the volume of the chamber 94. These portions are now replaced by a projected portion 102 of a first transfer cover 100 fixedly secured in seal tight manner to the portion of the transmission casing 28 and the transfer housing 48 to close the end 95 of the first bore 200.

The setting is such that the volume of the projected portion 102 are generally equal to the total of portions of the volume of the chamber 93 to be occupied by the transfer input shaft 42, its input gear 41 and the front wheel drive output gear 26. The circular configuration as shown in FIG. 6 is suitable for the projected portion 102. It is possible to leave the front wheel drive output gear 26 in the chamber 94 for use in two-wheel drive system. In this case, the volume of the projected portion 102 is reduced by the volume corresponding to this output gear 26.

A second transfer cover 104 is secured by bolts to the extended portion 46 and the transfer housing 48 to close the end 98 without any seal therebetween so as to allow air velt passage or gap to be formed. If the seal is to be used, the air vent passage must be formed in the seal or in the second transfer cover 104. The provision of such air vent is to prevent excessive expansion of air trapped in the bores 202 and 201 which leads to excessively high pressure build-up therein.

Inflow of lubrication oil into the bores 200 and 202 of the transfer housing 48 is prevented by the transfer cover 100. Besides, the level of oil within the chamber 94 is substantially unchanged owing to the projected portion 102 of the transfer cover 100 even if the transfer components are removed.

What is claimed is:

1. A transaxle for a drive system of a vehicle, the vehicle having a set of front wheels and a set of rear wheels adapted to be driven from a midship engine transversely mounted with respect to a longitudinal direction of the vehicle, said transaxle comprising:

transmission means, connected to the engine and having a main shaft, for transferring drive torque to said main shaft, said main shaft extending transversely with respect to the longitudinal direction of the vehicle, said main shaft having first and second gears fixed thereto;

a differential mechanism connected to said main shaft to receive drive torque for differential action between each of the rear wheels, said differential mechanism being disposed rearwardly of said main shaft with respect to the longitudinal direction of the vehicle, said differential mechanism including a differential case fixedly carrying an externally toothed ring gear;

a transfer case disposed forwardly of said main shaft with respect to the longitudinal direction of the vehicle, said transfer case including a transfer input shaft and a transfer output shaft, said transfer input shaft extending in parallel with said main shaft and having a fifth gear fixed thereto and engaged in mesh with said second gear of said main shaft, said transfer output shaft extending in the longitudinal directions; and an idler shaft extending in parallel with said main shaft, said idler shaft having a third gear fixed thereto and engaged in mesh with said first gear and a fourth gear fixed thereto and engaged in mesh with said externally toothed ring gear.

2. A transaxle for a drive system of a vehicle, the vehicle having a set of front wheels and a set of rear wheels adapted to be driven from a midship engine transversely mounted with respect to a longitudinal direction of the vehicle, said transaxle comprising:

transmission means, connected to the engine and having a main shaft, for transferring drive torque to said main shaft, said main shaft extending transversely with respect to the longitudinal direction of the vehicle and having a first gear fixed thereto;

a differential mechanism connected to said main shaft to receive drive torque for differential action between each of the rear wheels, said differential mechanism being disposed rearwardly of said main shaft with respect to the longitudinal direction of the vehicle, said differential mechanism including a differential case fixedly carrying an externally toothed ring gear;

a transfer case disposed forwardly of said main shaft with respect to the longitudinal direction of the vehicle; and an idler shaft, extending in parallel with said main shaft, having one end fixed to a second gear in mesh with said first gear and an opposite end fixed to a third gear in mesh with said ring gear.

3. A transaxle as claimed in claim 2, wherein said transmission means includes a transmission casing, and said transfer case includes a transfer housing, said transmission casing and said transfer housing cooperate with each other to define an opening, said transfer housing being disposed forwardly of said transmission casing with respect to the longitudinal direction of the vehicle, wherein said transmission means also includes a transmission casing cover secured to said transmission casing and said transfer housing and closing said opening, and wherein said transfer housing cooperates with a portion of said transmission casing to define a first bore having one end opposed to said transmission casing cover and an opposite end closed.

4. A transaxle as claimed in claim 3, wherein said transfer housing having an extended portion formed with a second bore having one end opening and an opposite end communicating with said first bore.

5. A transaxle for a drive system of a vehicle, the vehicle having a set of front wheels and a set of rear wheels adapted to be driven from a midship engine transversely mounted with respect to a longitudinal direction of the vehicle, said transaxle comprising:

transmission means, connected to the engine and having a main shaft, for transferring drive torque to said main shaft, said main shaft extending transversely with respect to the longitudinal direction of the vehicle;

a differential mechanism connected to said main shaft to receive drive torque for differential action between each of the rear wheels, said differential mechanism being disposed rearwardly of said main shaft with respect to the longitudinal direction of the vehicle;

a transfer case disposed forwardly of said main shaft with respect to the longitudinal direction of the vehicle;

said transmission means including a transmission casing, said transfer case including a transfer housing, said transmission casing and said transfer housing cooperating with each other to define an opening, said transfer housing being disposed forwardly of said transmission casing with respect to the longitudinal direction of the vehicle, said transmission means also including a transmission casing cover secured to said transmission casing and said transfer housing and closing said opening, wherein said transfer housing cooperates with a portion of said transmission casing to define a first bore having a first end opposed to said transmission casing cover and a second end opposite said first end, which is closed, said transfer housing having an extended portion formed with a second bore having a first end which is open and a second end, opposite said first end, which communicates with said first bore, wherein said transfer case includes a first transfer cover detachably mounted to said transfer housing and said portion of said transmission casing to close said first end of said first bore, said first transfer cover including means for reducing by a predetermined volume a space defined between said first end of said first bore of said transfer housing and said transmission cover.

6. The transaxle as claimed in claim 5, wherein said transfer case includes a second transfer cover detachably mounted to said extended portion of said transfer housing to close said one end of said second bore of said extended portion.

7. A transaxle as claimed in claim 6, wherein said second transfer cover cooperates with said extended portion of said transfer housing to define an air vent passage opening to said second bore.

8. A transaxle for a drive system of a vehicle having a longitudinal axis, a set of front wheels and a set of rear wheels adapted to be driven from a midship engine transversely mounted with respect to said longitudinal axis, said transaxle comprising:

a) transmission means connected to said engine and including a main shaft, a rear wheel drive gear attached to said main shaft, and a front wheel drive gear attached to said main shaft, said main shaft being transversely disposed relative to said longitudinal axis;

b) an idler shaft transversely disposed relative to said longitudinal axis and aft of said main shaft, said idler shaft including means to engage said rear wheel drive gear;

c) a transfer input shaft transversely disposed relative to said longitudinal axis and forward of said main shaft, said transfer input shaft including means to engage said front wheel drive gear;

d) rear differential means for driving said rear wheels, said rear differential means being connected to and driven by said idler shaft;

e) front differential means for driving said front wheels, said front differential means being connected to said transfer input shaft by means of a propeller shaft which is disposed longitudinally between said front differential means and a transfer output shaft, said transfer output shaft engaging said transfer input shaft in an approximately perpendicular manner by means of a bevel gear arrangement;

f) whereby said propeller shaft passes from said transfer output shaft to said front differential means without passing under or over any other part of said transaxle, and clearance between a road surface and said propeller shaft is maximized.

* * * * *